United States Patent [19]

Gantitano et al.

[11] Patent Number: 5,584,595
[45] Date of Patent: Dec. 17, 1996

[54] TWO PIECE TELEVISION RECEIVER CONSOLE

[75] Inventors: Anthony J. Gantitano; Masaru Uchiide, both of Escondido, Calif.

[73] Assignees: Sony Electronics, Inc.; Sony Corporation, both of Park Ridge, N.J.

[21] Appl. No.: 437,294

[22] Filed: May 8, 1995

[51] Int. Cl.⁶ ............................................. A47B 81/06
[52] U.S. Cl. ..................... 403/24; 403/326; 403/407.1; 312/7.2; 312/111
[58] Field of Search .................. 292/32, 33, 341.15; 312/7.2, 111; 403/326, 327, 407.1, 405.1, 24

[56] References Cited

U.S. PATENT DOCUMENTS

| | | | |
|---|---|---|---|
| 397,933 | 2/1889 | Pfingsten | 292/341.15 |
| 2,489,864 | 11/1949 | Cravener | 403/326 X |
| 2,592,073 | 4/1952 | Schwarzkopf | 292/341.15 X |
| 3,131,980 | 5/1964 | Barney | 312/7.2 |
| 3,563,624 | 2/1971 | Stice | 312/111 |
| 3,748,006 | 7/1973 | Levit et al. | 312/111 |
| 4,697,946 | 10/1987 | Rock et al. | 403/327 X |
| 4,796,930 | 1/1989 | Baynes | 292/341.15 X |
| 5,096,236 | 3/1992 | Thony | 292/32 |
| 5,383,721 | 1/1995 | Thomas | 312/7.2 |

Primary Examiner—Anthony Knight
Attorney, Agent, or Firm—Blakely, Sokoloff, Taylor & Zafman

[57] ABSTRACT

A two-piece television receiver console which has a mounting assembly that attaches a television receiver to a cabinet base. The mounting assembly includes a plurality of studs that extend through corresponding holes in the beznet of the receiver. The mounting assembly also contains spring loaded plates that capture the studs and attach the beznet to the cabinet base. A pair of brackets may further secure the rear wall of the receiver to the cabinet.

6 Claims, 2 Drawing Sheets

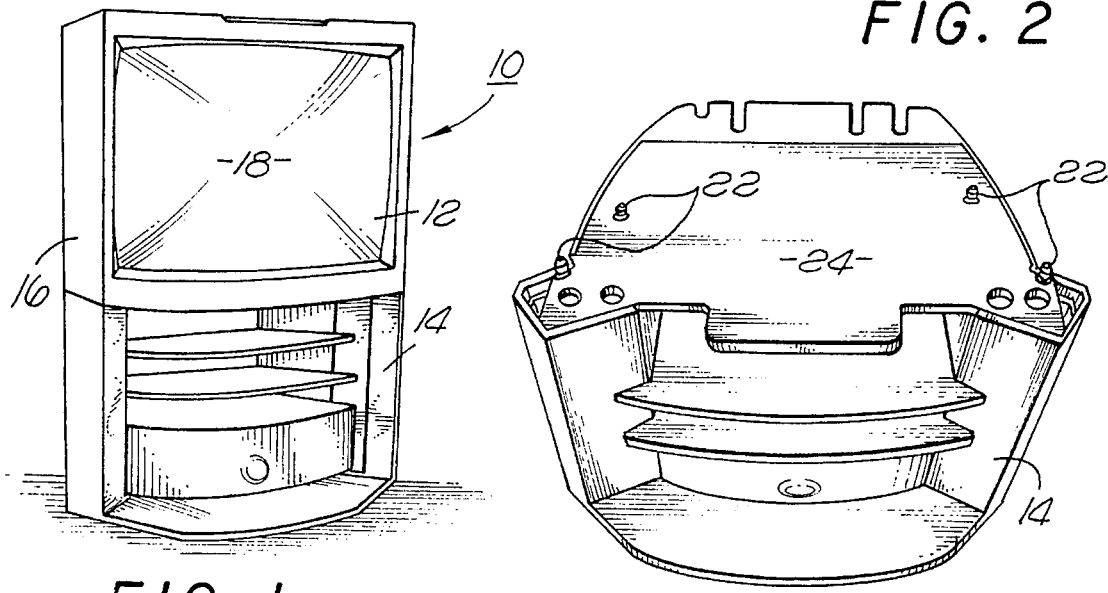
FIG. 1
FIG. 2
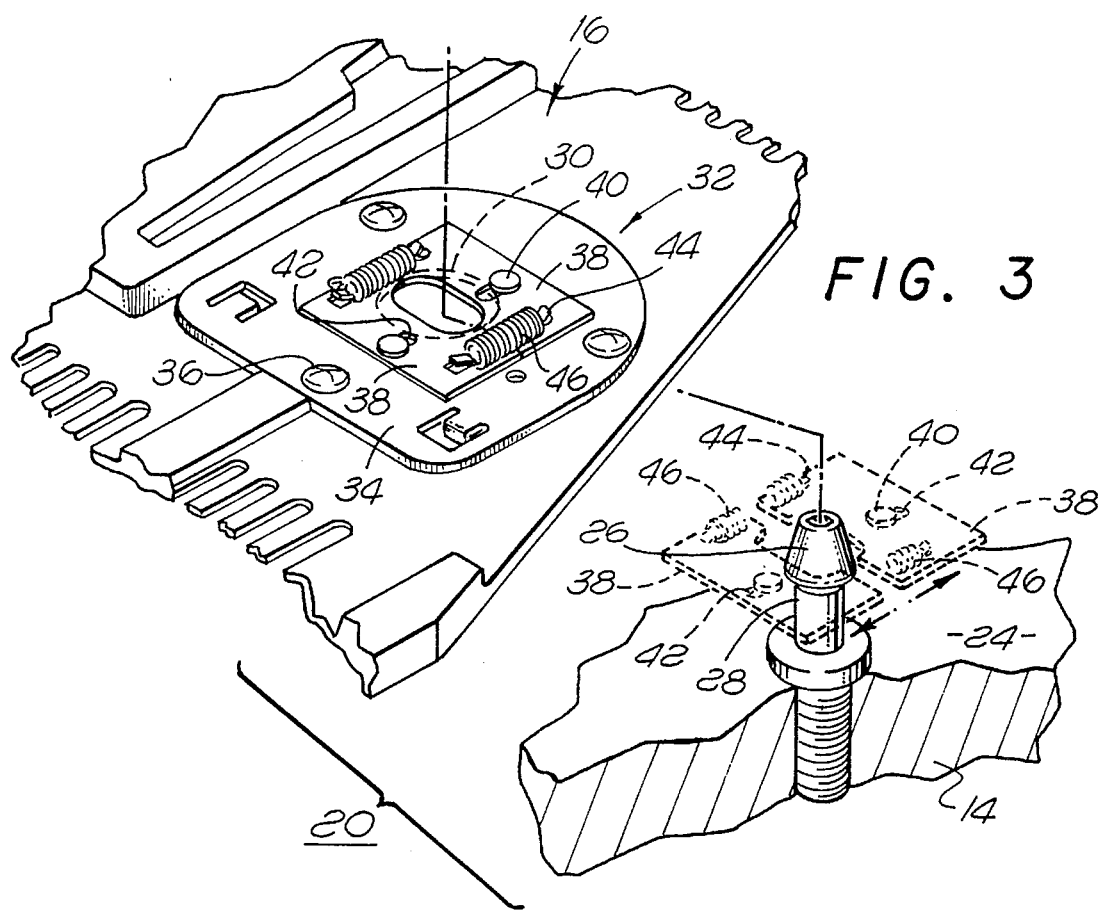
FIG. 3

TWO PIECE TELEVISION RECEIVER CONSOLE

BACKGROUND OF THE INVENTION

1. Field of the Invention

The present invention relates to a mounting bracket assembly for attaching a television receiver to a console cabinet.

2. Description of Related Art

Television receivers are sometimes marketed and sold with a console integrally formed with the beznet of the receiver. The consoles are typically more attractive and may provide additionally utility than a standard table top receiver. The receiver or console may become damaged to the extent that the unit must be repaired at a remote location. The entire one-piece receiver/console must therefore be shipped to the repair station. The consoles are relatively large and require a substantial amount of effort to move.

Manufacturing one-piece consoles is also more expensive than standard table top receivers. The production rates are relatively low for a one-piece console. Additionally, one-piece console designs have longer manufacturing line changes than a standard table top receiver. For these reasons, it is desirable to provide a two-piece television receiver console.

SUMMARY OF THE INVENTION

The present invention is a two-piece television receiver console which has a mounting assembly that attaches a television receiver to a cabinet base. The mounting assembly includes a plurality of studs that extend through corresponding holes in the beznet of the receiver. The mounting assembly also contains spring loaded plates that capture the studs and attach the beznet to the cabinet base. A pair of brackets may further secure the rear wall of the receiver to the cabinet.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 1 is a perspective view of a table top television receiver console of the present invention;

FIG. 2 is a top perspective view of a cabinet base;

FIG. 3 is a top perspective view of a mounting bracket assembly attached to the beznet of a television receiver;

DETAILED DESCRIPTION OF THE INVENTION

Figure 4:
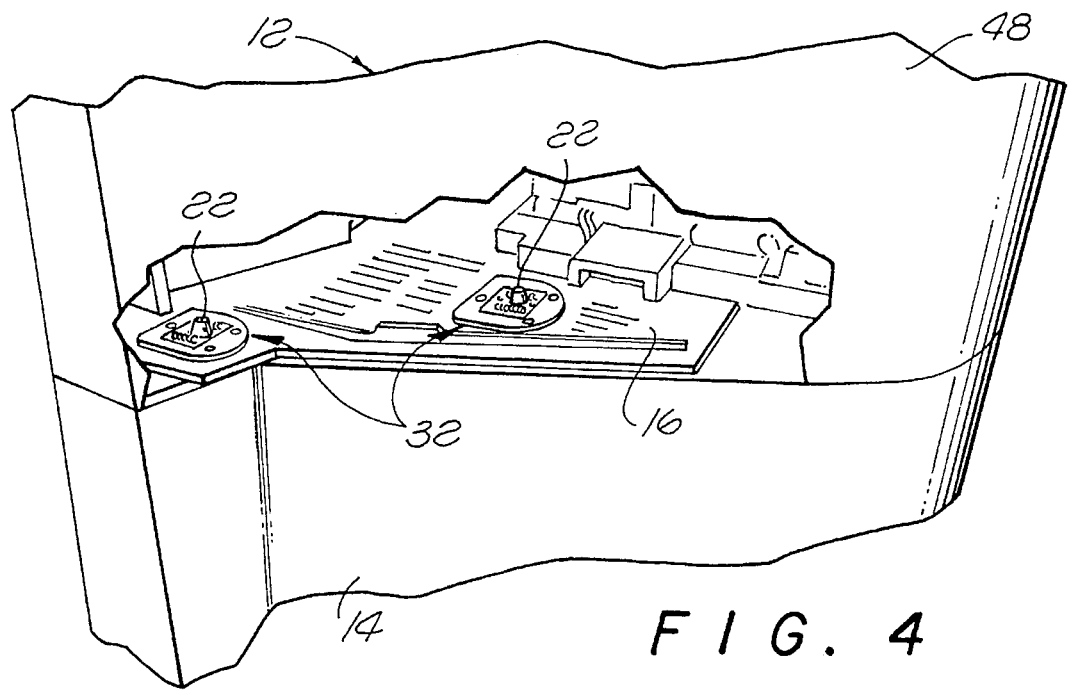
FIG. 4 is a top perspective view showing the stud captured by the mounting bracket assembly.

Referring to the drawings more particularly by reference numbers, FIG. 1 shows a television receiver console 10 of the present invention. The console 10 has a television receiver 12 mounted to a cabinet base 14. The cabinet base 14 may be constructed from a wood or plastic material. The base 14 may contain ridges, contoured surfaces, etc. to improve the appearance of the console 10. The television receiver 12 has a beznet 16 attached to a television screen 18. The beznet 16 may also be constructed from a wood or plastic material.

FIGS. 2 and 3 show the male and female portions of a mounting assembly 20 that attaches the television receiver 12 to the cabinet base 14. The assembly 20 includes a plurality of studs 22 that extend from a top surface 24 of the cabinet 14. Each stud 22 has a conical shaped tip 26 that extends from a neck portion 28. The studs 22 are typically constructed from a metal material and screwed into the top surface 24.

As shown in FIG. 3, the base of the beznet 16 has a plurality of apertures 30 which can receive the studs 22. The beznet 16 also has a plurality of mounting bracket assemblies 32. Each mounting bracket assembly 32 has a mounting bracket 34 attached to the beznet 16 by screws 36. Each bracket assembly 32 further contains a pair of clamp plates 38 that partially cover a corresponding aperture 30 of the beznet 16. The clamp plates 38 are held in place by a pair of thumb screws 40 that extend through slots 42 in the plate 38. The thumb screws 40 allow the plates 38 to move along the longitudinal axis of the slots 42. The plates 38 each have a pair of tabs 44 that are connected to a pair of springs 46. The springs 46 bias the plates into a locked position.

As shown in FIG. 4, the television receiver 12 can be attached to the cabinet base 14 by lowering the receiver 12 onto the base 14 so that the studs 22 extend through the apertures 30. The conical tips 26 of the studs 22 initially push the clamp plates 38 in a direction away from the apertures 30. When the tips 26 have extended past the clamp plates 38, the springs 46 push the plates 38 into engagement with the neck portions 28 of the studs 22. The wide base portions of the tips 26 prevent the studs 22 from being pulled back through the apertures 30, thereby securing the receiver 12 to the base 14. A rear cover 48 can then be attached to the beznet 16 to enclose the television receiver 12.

Figure 5:
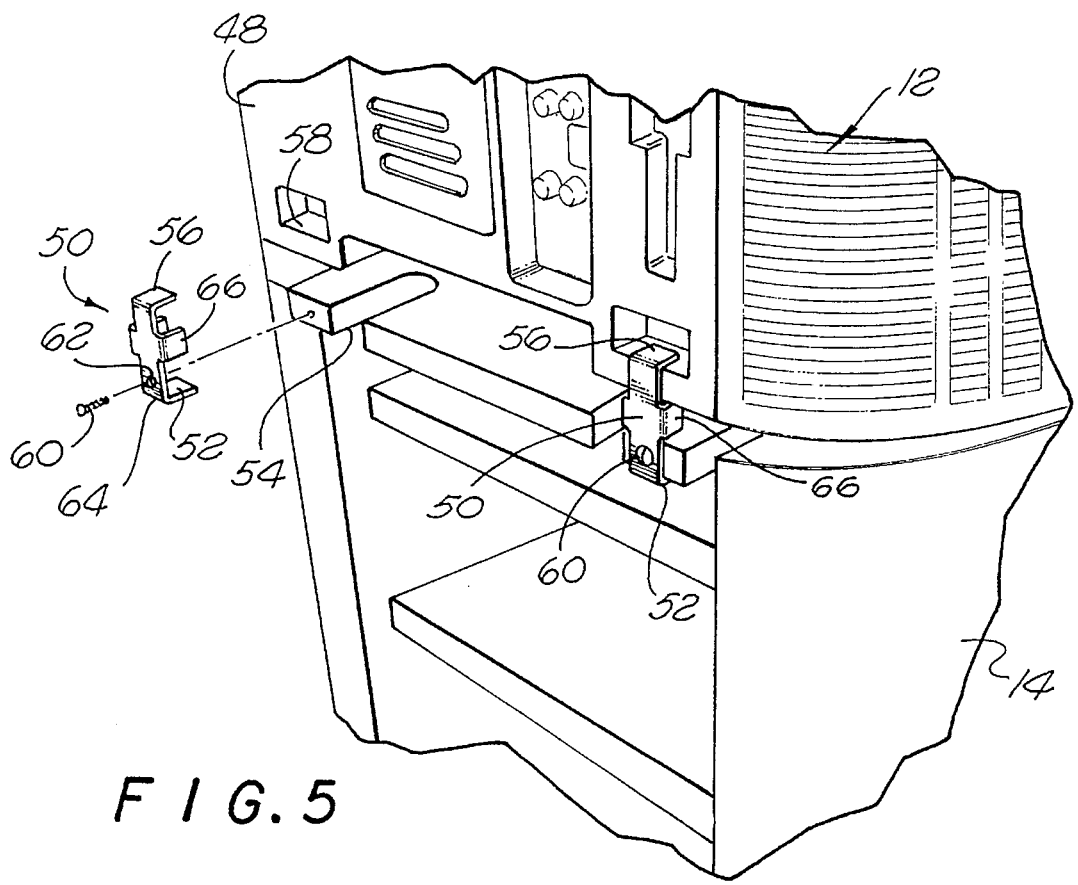
FIG. 5 is a rear perspective view showing a pair of rear mounting brackets attached to the console.

As shown in FIG. 5, the television receiver 12 can be further secured to the cabinet base 14 by a pair of C-shaped brackets 50. Each bracket 50 has a lower flange 52 that engages a lower lip 54 of the cabinet base 14 and an upper flange 56 that engages a wall 58 of the rear cover 48. The upper flange 56 extends from the bracket at an inclined angle to compensate for tolerances in the console assembly. The brackets 50 are fastened to the base 14 by screws 60 which extend through clearance holes 62 in the bracket base 64. Each bracket 50 may have a pair of tabs 66. The tabs 66 prevent the television receiver 12 from rotating and "rocking" in a downward direction relative to the base 14.

The television receiver 12 can be separated from the cabinet 14 by initially removing the brackets 50 and rear cover 48. The clamping plates 38 can then be separated from the neck portions 26 so that the receiver 12 can be lifted and the studs 22 pulled through the apertures 30. The mounting assembly 20 of the present invention provides a television receiver 12 that can be readily attached and detached from a cabinet base 14.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A television receiver console, comprising:

a cabinet base that has a bottom surface and an opposite top surface;

a stud that extends from said top surface of said cabinet base;

a television receiver that has an aperture which receives said stud;

a pair of plates that partially cover said television receiver aperture; and, a spring that biases said plates into engagement with said stud so that said plates capture said stud and attach said television receiver to said cabinet base.

2. The console as recited in claim 1, further comprising a C-shaped bracket that secures a rear portion of said television receiver to a rear portion of said cabinet base.

3. The console as recited in claim 2, wherein said stud has a conical shaped tip and a neck that is captured by said plates.

4. The console as recited in claim 3, wherein said plates are coupled to a mounting bracket by a pair of thumb screws that extend through a pair of corresponding slots in said plates.

5. The console as recited in claim 4, wherein said plates have a plurality of tabs connected to a pair of springs that bias said plates into contact with said stud.

6. A method for assembling a television console, comprising the steps of:

a) providing a cabinet base which has a stud that extends from a top surface;

b) providing a television receiver which has an aperture, said television receiver further has a pair of plates that partially cover said aperture and are biased into a locked position by a spring; and, c) inserting said stud into said aperture so that said stud pushes said plates into an extended position and then said spring moves said plates back to engage said stud in the locked position to capture said stud and attach said television receiver to said cabinet base.

* * * * *